(12) United States Patent
Dwenger et al.

(10) Patent No.: US 10,815,939 B2
(45) Date of Patent: Oct. 27, 2020

(54) SEPARATION DEVICE, MOTOR DEVICE, AND SEPARATION METHOD

(71) Applicants: ElringKlinger AG, Dettingen (DE); Bayerische Motoren Werke Aktiengesellschaft, Munich (DE)

(72) Inventors: Stefan Dwenger, Reutlingen (DE); Roman Enne, Behamberg (AT)

(73) Assignees: ElringKlinger AG, Dettingen (DE); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/383,805

(22) Filed: Apr. 15, 2019

(65) Prior Publication Data
US 2019/0242332 A1 Aug. 8, 2019

Related U.S. Application Data (63) Continuation of application No. PCT/EP2017/076386, filed on Oct. 16, 2017.

(30) Foreign Application Priority Data

Oct. 21, 2016 (DE) ........................ 10 2016 220 770

(51) Int. Cl.
*F02M 26/06* (2016.01)
*F02M 26/05* (2016.01)
(Continued)

(52) U.S. Cl.
CPC ............ *F02M 26/06* (2016.02); *F01M 13/00* (2013.01); *F01M 13/021* (2013.01);
(Continued)

(58) Field of Classification Search
CPC ........ F02M 26/06; F02M 26/00; F02M 26/36; F02M 25/00; F02M 25/06; F02M 26/05;
(Continued)

(56) References Cited

U.S. PATENT DOCUMENTS 4,557,226 A 12/1985 Mayer et al.
5,456,239 A * 10/1995 Henderson ........... F01M 13/021
123/572

(Continued)

FOREIGN PATENT DOCUMENTS

DE 10 2007 035 355 A1 1/2009
DE 102009032835 A1 * 2/2011 ........... F01M 13/022
(Continued)

*Primary Examiner* — Thai Ba Trieu
(74) *Attorney, Agent, or Firm* — Aslan Law, P.C.

(57) ABSTRACT

In order to provide a separating device which has a simple design and is operable reliably and efficiently, it is proposed that the separating device comprises the following: at least one separating body for separating the impurities; an ejector device for producing a suction effect on an exit side of the at least one separating body; a supply device for supplying a drive medium to the ejector device, wherein, by means of the supply device, selectively a) compressed supply air from a supply air tract of the combustion engine, b) exhaust gas from an exhaust gas tract of the combustion engine and/or c) a mixture of compressed supply air and exhaust gas is suppliable as drive medium to the ejector device.

17 Claims, 4 Drawing Sheets

(51) Int. Cl.
*F02M 26/36* (2016.01)
*F02M 26/00* (2016.01)
*F02M 25/00* (2006.01)
*F02M 25/06* (2016.01)
*F01M 13/02* (2006.01)
*F01M 13/04* (2006.01)
*F01M 13/00* (2006.01)
*F02D 41/00* (2006.01)

(52) U.S. Cl.
CPC ......... *F01M 13/04* (2013.01); *F02D 41/0047* (2013.01); *F02M 25/00* (2013.01); *F02M 25/06* (2013.01); *F02M 26/00* (2016.02); *F02M 26/36* (2016.02); *F01M 2013/026* (2013.01); *F01M 2013/027* (2013.01); *F02D 2250/08* (2013.01); *F02M 26/05* (2016.02); *Y02T 10/47* (2013.01)

(58) Field of Classification Search
CPC ...... F01M 13/00; F01M 13/021; F01M 13/04; F01M 2013/026; F01M 2013/027; F02D 41/0007; F02D 2250/08; Y02T 10/47
USPC .............. 60/605.1, 605.2; 123/572–574
See application file for complete search history.

(56) References Cited

U.S. PATENT DOCUMENTS

| | | | | |
|---|---|---|---|---|
| 5,803,025 A * | 9/1998 | Feucht | ............... | F01M 13/04 60/283 |
| 5,937,837 A * | 8/1999 | Shaffer | ............... | F01M 13/04 123/573 |
| 6,516,787 B1 * | 2/2003 | Dutart | ............... | F02M 25/12 123/568.11 |
| 6,558,848 B1 * | 5/2003 | Kobayashi | ............... | H01M 4/80 429/241 |
| 7,100,587 B2 * | 9/2006 | Ahlborn | ............... | F01M 13/021 123/572 |
| 7,198,762 B1 * | 4/2007 | Teboul | ............... | F01N 3/01 422/177 |
| 7,320,316 B2 * | 1/2008 | Moncelle | ............... | F02M 25/06 123/572 |
| 7,434,571 B2 * | 10/2008 | Moncelle | ............... | F02M 25/06 123/572 |
| 7,784,449 B2 * | 8/2010 | Maly | ............... | F02M 25/0818 123/516 |
| 7,913,676 B2 * | 3/2011 | Breuninger | ............... | F01M 13/022 123/572 |
| 8,124,550 B2 * | 2/2012 | Greiner | ............... | D04H 1/4382 442/364 |
| 8,337,762 B2 * | 12/2012 | Vakkilainen | ............... | F01N 3/281 422/177 |
| 8,393,315 B2 * | 3/2013 | Ruppel | ............... | F01M 13/022 123/572 |
| 9,238,980 B2 * | 1/2016 | An | ............... | F01M 13/04 |
| 9,347,368 B2 * | 5/2016 | Ulrey | ............... | F01M 13/022 |
| 9,359,923 B2 * | 6/2016 | Pursifull | ............... | F01M 13/00 |
| 9,932,869 B2 * | 4/2018 | An | ............... | F01M 13/04 |
| 2009/0025662 A1 | 1/2009 | Herman et al. | | |
| 2014/0224232 A1 | 8/2014 | Hotta | | |
| 2015/0020785 A1 * | 1/2015 | An | ............... | F01M 13/04 123/572 |
| 2015/0053188 A1 | 2/2015 | Kuribayashi et al. | | |
| 2015/0247432 A1 | 9/2015 | Fujikawa | | |

FOREIGN PATENT DOCUMENTS

| | | |
|---|---|---|
| DE | 11 2011 105 854 T5 | 8/2014 |
| DE | 11 2008 001 692 B4 | 12/2015 |
| EP | 0 142 092 B1 | 1/1988 |
| EP | 2 775 111 A1 | 9/2014 |
| EP | 2 913 492 A1 | 9/2015 |
| EP | 3 020 935 A2 | 5/2016 |
| JP | 2005310444 A * | 11/2005 |
| JP | 2009 133292 A | 6/2009 |
| JP | 2019160557 A * | 9/2019 |

* cited by examiner

SEPARATION DEVICE, MOTOR DEVICE, AND SEPARATION METHOD

RELATED APPLICATION

This application is a continuation of international application No. PCT/EP2017/076386 filed on Oct. 16, 2017, and claims the benefit of German application No. 10 2016 220 770.9 filed on Oct. 21, 2016, which are incorporated herein by reference in their entirety and for all purposes.

FIELD OF DISCLOSURE

The present invention relates to a separating device for separating impurities from a raw gas stream, in particular for separating an oil mist from an oil mist-containing blow-by gas stream of a combustion engine. A separating device of this kind can be used in particular in an engine device. Preferably a separation method can be carried out by means of the separating device.

SUMMARY OF THE INVENTION

The object of the present invention is to provide a separating device which has a simple design and which is operable reliably and efficiently.

This object is achieved in accordance with the invention by a separating device.

The separating device for separating impurities from a raw gas stream, in particular for separating an oil mist from an oil mist-containing blow-by gas stream of a combustion engine, preferably comprises the following:

at least one separating body for separating the impurities;

an ejector device for producing a suction effect on an exit side of the at least one separating body;

a supply device for supplying a drive medium to the ejector device, wherein, by means of the supply device, selectively a) compressed supply air from a supply air tract of the combustion engine, b) exhaust gas from an exhaust gas tract of the combustion engine and/or c) a mixture of compressed supply air and exhaust gas is suppliable as drive medium to the ejector device.

Compressed supply air is in particular supply air of a supply air tract of the combustion engine which is branched off from a supply air line of the supply air tract, in particular in relation to a flow direction of the supply air between a compressor device and combustion chambers of the combustion engine.

The exhaust gas is in particular an exhaust gas branched off from an exhaust gas line of the exhaust gas tract of the combustion engine.

The ejector device is preferably a jet pump, in particular a suction jet pump.

A pressure drop required by means of the separating body for the separation can be increased preferably by means of the ejector device.

It can be provided that the supply device comprises a control device.

The control device, for open-loop and/or closed-loop control of the feed device, is preferably configured and set up in such a way that the drive medium is selectable depending on the different operating states of the combustion engine.

The drive medium is preferably adjustable, in particular controllable by open-loop and/or closed-loop control, in respect of its composition and/or its volumetric flow rate.

For example, a different mixing ratio of supply air and exhaust gas can be selected, adjusted or controlled by open-loop and/or closed-loop control, depending on different operating states of the combustion engine.

In one embodiment of the invention it can be provided that, on the basis of and/or depending on prevailing pressure differences between a pressure in the supply air tract on the one hand and a pressure in the exhaust gas tract on the other hand, it is possible to control, by means of the control device by open-loop and/or closed-loop control, whether and/or at what volumetric gas flow rate exhaust gas is fed as drive medium to the ejector device.

The control device in particular controls a valve device, in particular a valve, a flap, a control valve, a throttle, etc.

A valve device in this description is m particular a device by means of which a volumetric flow rate of the exhaust gas and/or supply air can be varied, in particular increased, reduced, completely blocked or completely decontrolled. Furthermore, a flow deflection or diversion can preferably be provided by means of a valve device.

The pressure in the supply air tract is preferably a pressure downstream of a compression device of the supply air tract and/or upstream of combustion chambers of the combustion device.

However, it can also be provided that the pressure in the supply air tract, which is used as input parameter for the control device, is a pressure upstream of the compression device of the supply air tract.

The pressure in the exhaust gas tract is preferably a pressure downstream of a turbine device and/or downstream of the catalytic device of the exhaust gas tract and/or downstream of a particle filter of the exhaust gas tract.

Alternatively or additionally, it can be provided that the pressure in the exhaust gas tract is a pressure upstream of a cooling device of a low-pressure exhaust gas recirculation device, upstream of a particle filter; upstream of a catalytic device and/or upstream of a turbine device of the exhaust gas tract.

It may be favourable if the control device is an active control device, which acts actively on a valve device of the supply device, in particular in a sensor-controlled manner, electrically, mechanically and/or pneumatically.

In an active control device there is in particular no direct mechanical actuation of the valve device on the basis of prevailing pressure differences. Rather, the valve device, with use of an active control device, preferably can be actuated in principle independently of prevailing pressure levels.

However, it can also be provided that the control device is a passive control device, in which the valve device is actuated mechanically and directly on the basis of prevailing pressure levels.

A control device of this kind is in particular formed jointly with the valve device, for example as an automatic switch element, which in particular does not have an external actuation means and releases, increases, reduces or blocks a volumetric flow rate, in particular an exhaust gas volumetric flow rate, preferably merely on account of prevailing pressure levels and/or pressure differences.

In particular there is no need for ECU-dependent actuation in the case of a passive control device.

It can be provided that the control device comprises one or more sensor elements for providing current measurement values. The supply device is preferably controllable by means of the control device depending on these measurement values.

A sensor element is preferably arranged upstream of the compression device.

Alternatively or additionally, it can be provided that a sensor element is arranged downstream of the compression device and/or upstream of combustion chambers of the combustion engine.

Alternatively or additionally, it can be provided that a sensor element is arranged downstream of combustion chambers of the combustion engine.

It can be favourable if a sensor element, in relation to a flow direction of the exhaust gas in the exhaust gas tract, is arranged between combustion chambers of the combustion engine on the one hand and a turbine device on the other hand.

Alternatively or additionally, it can be provided that a sensor element, in relation to a flow direction of the exhaust gas in the exhaust gas tract, is arranged between a turbine device and a catalytic device of the exhaust gas tract.

It can furthermore be provided alternatively or additionally that a sensor element, in relation to a flow direction of the exhaust gas in the exhaust gas tract, is arranged between a catalytic device and a particle filter of the exhaust gas tract.

It can be provided that a sensor element, in relation to a flow direction of the exhaust gas in the exhaust gas tract, is arranged between a particle filter and an exhaust gas recirculation device, in particular a low-pressure exhaust gas recirculation device.

It can be advantageous if the exhaust gas tract has a check flap for checking the exhaust gas, in particular in order to increase the exhaust gas pressure in the exhaust gas tract.

A sensor element is preferably arranged directly upstream of a check flap of this kind.

It may also be provided that a sensor element is arranged downstream of a cooling device of an exhaust gas recirculation device in the exhaust gas tract, in particular before a supply line of the returned exhaust gas to a supply air tract.

The separating body is preferably a non-woven separator or comprises a non-woven separator.

It can be favourable if the separating body is a passive separator or comprises a passive separator.

The separating body may also comprise a baffle plate separator, a cyclone, an impactor or the like, or may be formed as such.

It can be provided that the separating body is formed as an impactor non-woven separator in one embodiment of the invention.

In one embodiment of the invention it can be provided that the exhaust gas used as drive medium is branched off from the exhaust gas tract downstream of combustion chambers of the combustion engine, downstream of a turbine device of the exhaust gas tract, downstream of a catalytic device of the exhaust gas tract, downstream of a particle filter of the exhaust gas tract and/or downstream of a cooling device of an exhaust gas recirculation device of the combustion engine.

Alternatively or additionally, it can be provided that the exhaust gas used as drive medium is branched off from the exhaust gas tract upstream of a turbine device of the exhaust gas tract, upstream of a catalytic device of the exhaust gas tract, upstream of a particle filter of the exhaust gas tract and/or upstream of a cooling device of an exhaust gas recirculation device of the combustion engine.

The compressed supply air from the supply air tract and the exhaust gas from the exhaust gas tract are preferably mixed with each other before being supplied to the ejector device. The separating device for this purpose comprises preferably a merging device for merging and/or for mixing the supply air with the exhaust gas.

The merging device in particular opens out into the injector device.

It can be advantageous if a check valve is arranged between the supply air tract on the one hand and the ejector device on the other hand.

Alternatively or additionally, it can be provided that a check valve is provided between the exhaust gas tract on the one hand and the ejector device on the other hand.

In particular by use of two check valves, a passage of exhaust gas into the supply air tract and/or supply air into the exhaust gas tract preferably can be prevented.

In the separating device, exhaust gas from a low-pressure exhaust gas recirculation is preferably used in order to drive the ejector device, in particular in order to supplement a supply air stream used for operation of the ejector device.

In particular by the use of nozzles and/or bores, it is preferably possible to limit the mass flow of the exhaust gas in the low-pressure exhaust gas recirculation device and/or to limit the mass flow in the supply air tract.

The use of an ejector device and the use of exhaust gas from the low-pressure exhaust gas recirculation device preferably result in advantages with respect to efficiency in the operation of the separating device.

In particular if exhaust gas is branched off from the exhaust gas tract of a turbine device, a complete exhaust gas mass flow can be supplied from the combustion chambers to the turbine device, and therefore the maximum available energy can be utilized.

Furthermore, by the use of exhaust gas from the low-pressure exhaust gas recirculation device, compressed supply air (charge air) preferably can be prevented from being branched off and thus resulting in only a smaller charge air amount (mass flow of the compressed supply air) being available for the combustion in the combustion chambers.

The separating device according to the invention is suitable in particular for use in an engine device.

The present invention therefore also relates to an engine device which comprises a combustion engine and a separating device according to the invention.

It can be favourable if the engine device, in addition to the separating device, comprises one or more or all of the following components:

a turbocharger device which comprises in particular a turbine device and a compression device;

a compressor device which comprises a compression device;

a catalytic device;

a particle filter; and/or an exhaust gas recirculation device, in particular a low-pressure exhaust gas recirculation device.

The engine device according to the invention preferably has individual or multiple features and/or advantages of the kind described in conjunction with the separating device according to the invention.

The engine device preferably has a throttle, a check flap and/or a valve device, by means of which the pressure in the exhaust gas tract can be increased, for example by at least approximately 100 mbar, preferably by at least approximately 200 mbar.

By branching off exhaust gas, in particular from the low-pressure exhaust gas recirculation, a sufficient pressure for operating the ejector device can thus preferably be provided.

The exhaust gas can be branched off in the low-pressure exhaust gas recirculation upstream or downstream of a cooling device of the low-pressure exhaust gas recirculation.

The separating device is in particular coupled to the combustion engine in such a way that crankcase gas can be aspirated from the combustion engine and can be guided through the separating device in order to remove oil mist from the crankcase gas.

The separating device is therefore used in particular for crankcase ventilation.

The present invention also relates to a separation method for separating impurities from a raw gas stream.

The object of the present invention in this regard is to provide a separation method which can be carried out easily, reliably and efficiently.

This object is achieved in accordance with the invention by a separation method.

The separation method according to the invention preferably has individual or multiple features and/or advantages of the kind described in conjunction with the separating device according to the invention and/or the engine device according to the invention.

It can also be provided that the separating device according to the invention and/or the engine device according to the invention have individual or multiple features and/or advantages of the kind described in conjunction with the separating device according to the invention.

The separation method is used in particular to separate oil mist from an oil mist-containing blow-by gas stream of a combustion engine.

In particular, the separation method can be carried out with use of a separating device, preferably a separating device according to the invention.

The separation method preferably comprises the following:

supplying a drive medium to an ejector device, wherein selectively a) compressed supply air from a supply tract of the combustion engine, b) exhaust gas from an exhaust gas tract of the combustion engine and/or c) a mixture of compressed supply air and exhaust gas is supplied as drive medium to the ejector device;

extracting and/or aspirating the raw gas stream by means of the ejector device, wherein and/or whereby the raw gas stream flows through a separating body and impurities on and/or in the separating body are separated.

Further preferred features and/or advantages of the invention are the subject of the following description and the illustration in the form of drawings of exemplary embodiments.

Like or functionally equivalent elements are provided with the same reference signs in all figures.

DETAILED DESCRIPTION OF THE DRAWINGS

Figure 1:
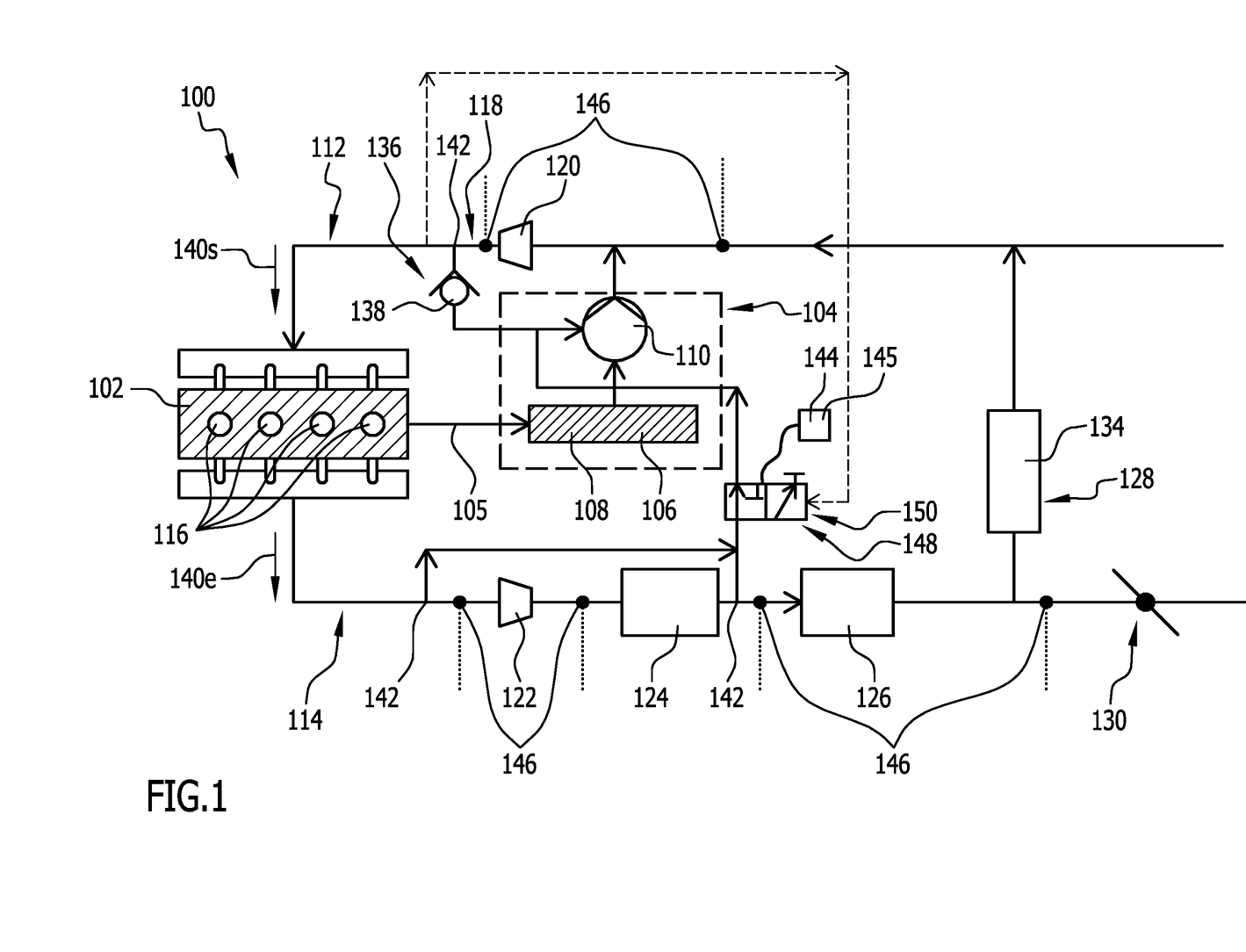
FIG. 1 shows a schematic illustration of a first embodiment of an engine device with a first embodiment of a separating device.

A first embodiment, depicted in FIG. 1, of an engine device denoted as a whole by 100 comprises a combustion engine 102, for example a reciprocating engine of a motor vehicle, in particular of a passenger vehicle or heavy goods vehicle.

During operation of the combustion engine 102, contaminated gases can form in a crankcase of the combustion engine 102. In particular, this gas may be an oil mist-containing blow-by gas.

This oil mist-containing blow-by gas must be discharged from the combustion engine 102 and cleaned.

The oil mist-containing blow-by gas will be referred to more generally hereinafter as a raw gas stream. The oil mist forms impurities of the raw gas stream.

In order to clean the raw gas stream, in particular in order to remove the impurities from the raw gas stream, the engine device 100 comprises a separating device 104.

The raw gas stream discharged from the combustion engine 102 is directed to the separating device 104 via a line 105.

The separating device 104 comprises in particular a separating body 106, through which the raw gas stream is passed in order to remove the impurities from the raw gas stream.

The separating body 106 is in particular a non-woven separator 108, for example an impactor non-woven separator.

As the raw gas stream passes through the separating device 104, a pressure difference is established in the raw gas stream, in particular between a pressure at the inlet of the separating body 106 and a pressure at the exit of the separating body 106.

With suitable configuration of the separating body 106, the separating efficiency can be increased by a greater pressure difference.

The separating device 104 for this purpose comprises an ejector device 110, which, in relation to a flow direction of the raw gas stream, is preferably arranged downstream of the separating body 106 and causes a suction effect for aspirating the raw gas stream on an exit side of the separating body 106.

The ejector device 110 is in particular a suction jet pump or comprises a suction jet pump of this kind. It is provided here that the raw gas stream is aspirated as a suction medium by means of the ejector device 110.

A drive medium necessary to generate the suction effect is formed for example by supply air and/or exhaust gas.

In particular, for this purpose supply air is branched off from a supply air tract 112 of the engine device 100 and/or exhaust gas is branched off from an exhaust gas tract 114 of the engine device 100 and supplied as drive medium to the ejector device 110.

Hereinafter, the details of the supply air tract 112 and of the exhaust gas tract 114 will be discussed in greater detail, before the ejector device 110 is then described again, in greater detail.

The supply air tract 112 is used for supplying supply air, in particular fresh air, to combustion chambers 116 of the combustion engine 102.

The combustion engine 102 for example may be a fully naturally aspirated engine.

However, it may also be that the combustion engine 102 is a (super-/turbo-) charged engine.

In particular, it may be provided that the engine device 100 comprises a turbocharger device 118.

A turbocharger device 118 of this kind comprises in particular a compression device 120, which is part of the supply air tract 112, and a turbine device 122, which is part of the exhaust gas tract 114.

The exhaust gas tract 114 is used in particular to discharge exhaust gas from the combustion chambers 116 of the combustion engine 102 and to clean the exhaust gas and to recover energy.

The exhaust gas tract 114 preferably comprises the turbine device 122, a catalytic device 124, a particle filter 126 and/or an exhaust gas recirculation device 128.

A check flap 130 may also be part of the exhaust gas tract 114.

The catalytic device 124 is in particular a diesel oxidation catalytic device and/or a storage catalytic device for retaining nitrogen oxide.

The particle filter 126 is in particular a diesel particle filter.

The exhaust gas recirculation device 128 is in particular a low-pressure exhaust gas recirculation device 132.

The exhaust gas recirculation device 128 preferably comprises a cooling device 134 for cooling the exhaust gas that is to be returned.

By means of the exhaust gas recirculation device 128, in particular exhaust gas can be removed from the exhaust gas tract 114 and supplied to the supply air tract 112.

The separating device 104, in particular the ejector device 110, is preferably coupled on the one hand to the supply air tract 112 and on the other hand to the exhaust gas tract 114.

In particular, a supply device 136 of the separating device 104 is preferably provided, by means of which on the one hand supply air can be branched off from the supply air tract 112 and can be supplied as drive medium to the ejector device, and on the other hand exhaust gas can be branched off from the exhaust gas tract 114 and can be supplied as drive medium to the ejector device 110.

By means of the supply device 136, it is ensured, in particular depending on different operating states of the engine device 100, that a pressure and/or a volumetric flow rate of the drive medium necessary to operate the ejector device 110 is always high enough. In particular, by means of the supply device 136 it can be ensured that a crankcase is reliably ventilated, preferably unimpaired by the different operating states of the combustion engine 102.

The supply device 136 preferably comprises one or more check valves 138, which avoid an undesirable backflow of supply air to the supply tract 112 and/or of exhaust gas to the exhaust gas tract 114.

In particular, by means of the check valve 138 or by means of the check valves 138, an undesirable overflow of exhaust gas into the supply air tract 112 and/or of supply air into the exhaust gas tract 114 preferably can be avoided.

In relation to a flow direction 140s of the supply air in the supply air tract 112, a branch 142 for branching supply air from the supply air tract 112 is arranged preferably downstream of the compression device 120.

By means of the supply device 136, preferably compressed supply air can thus be branched off via the branch 142 and supplied as drive medium to the ejector device 110.

Preferably at least one branch 142 is also arranged in the exhaust gas tract 114. In relation to a flow direction 140 of the exhaust gas in the exhaust gas tract 114, a branch 142 is preferably arranged between the combustion chambers 116 and the turbine device 122.

Alternatively or additionally, it can be provided that a (further) branch 142 is arranged between the catalytic device 124 and the particle filter 126 in relation to the flow direction 140e of the exhaust gas in the exhaust gas tract 114.

Exhaust gas can thus be branched off from the exhaust gas tract 114 via the one or two branches 142 and can be supplied as drive medium via the supply device 136 to the ejector device 110.

Depending on the current operating state of the combustion engine 102, optionally only compressed supply air, only exhaust gas, or both supply air and exhaust gas can be used as drive medium for the ejector device 110.

The choice of the volumetric flow rates of the exhaust gas used as drive medium and/or of the supply air used as drive medium is preferably made by means of a control device 144 of the separating device 104. The control device 144 for example may be an active control device 145.

In the case of an active control device 145 of this kind, in particular the use of one or more sensor elements 146 is provided, so as to be able to determine different measurement values, in particular pressure measurement values, in the supply air tract 112 and/or in the exhaust gas tract 114. A valve device 148 of the separating device 104 preferably is then influenced depending on the determined measured values.

In particular, a fluidic connection between the exhaust gas tract 114 and the ejector device 110 can be established by means of the valve device 148, so as to be able to use exhaust gas as drive medium if, in different operating modes of the combustion engine 102, the pressure in the supply air tract 112 is too low for example.

It can also be provided, however, that the control device 144 is a passive control device 144.

In the case of a passive control device 144 of this kind, a pressure-activated coupling between the supply air tract 112, the exhaust gas tract 114 and/or a switch element 150 is preferably produced. By means of the switch element 150, it is then possible to automatically influence mechanically the exhaust gas volumetric flow rate used as drive medium, without complex electronic closed-loop or open-loop control, in particular depending on pressure differences between the pressure in the supply air tract 112 and the pressure in the exhaust gas tract 114.

Figure 2:
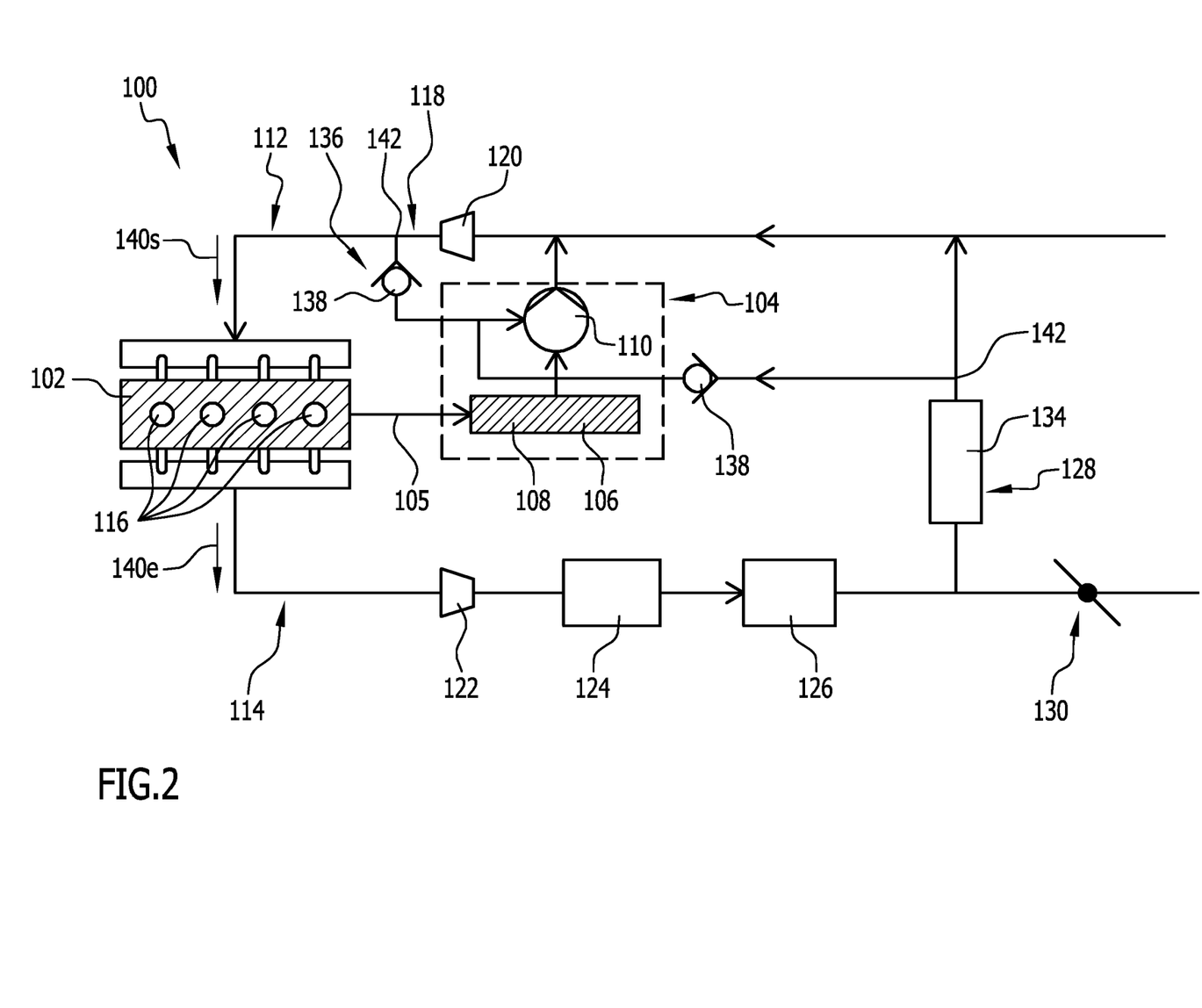
FIG. 2 shows a schematic illustration of a second embodiment of an engine device with a second embodiment of a separating device.

A second embodiment of an engine device 100 shown in FIG. 2 differs from the first embodiment shown in FIG. 1 basically merely by the way in which the separating device 104, in particular the ejector device 110, is incorporated.

In the embodiment of the engine device 100 shown in FIG. 2, it is provided that exhaust gas used as drive medium is branched off downstream of a cooling device 134 of the exhaust gas recirculation device 128 for operation of the ejector device 110. In particular if the engine device 100 as a whole is operated with firmly closed check flap 130 and consequently high pressure in the exhaust gas recirculation device 128, the drive medium flow rate required for operation of the ejector device 110 can then be provided easily and efficiently.

For the rest, the second embodiment of the engine device 100 depicted in FIG. 2 is consistent in respect of structure and function with the first embodiment depicted in FIG. 1, and therefore reference is made in that respect to the description thereof provided further above.

Figure 3:
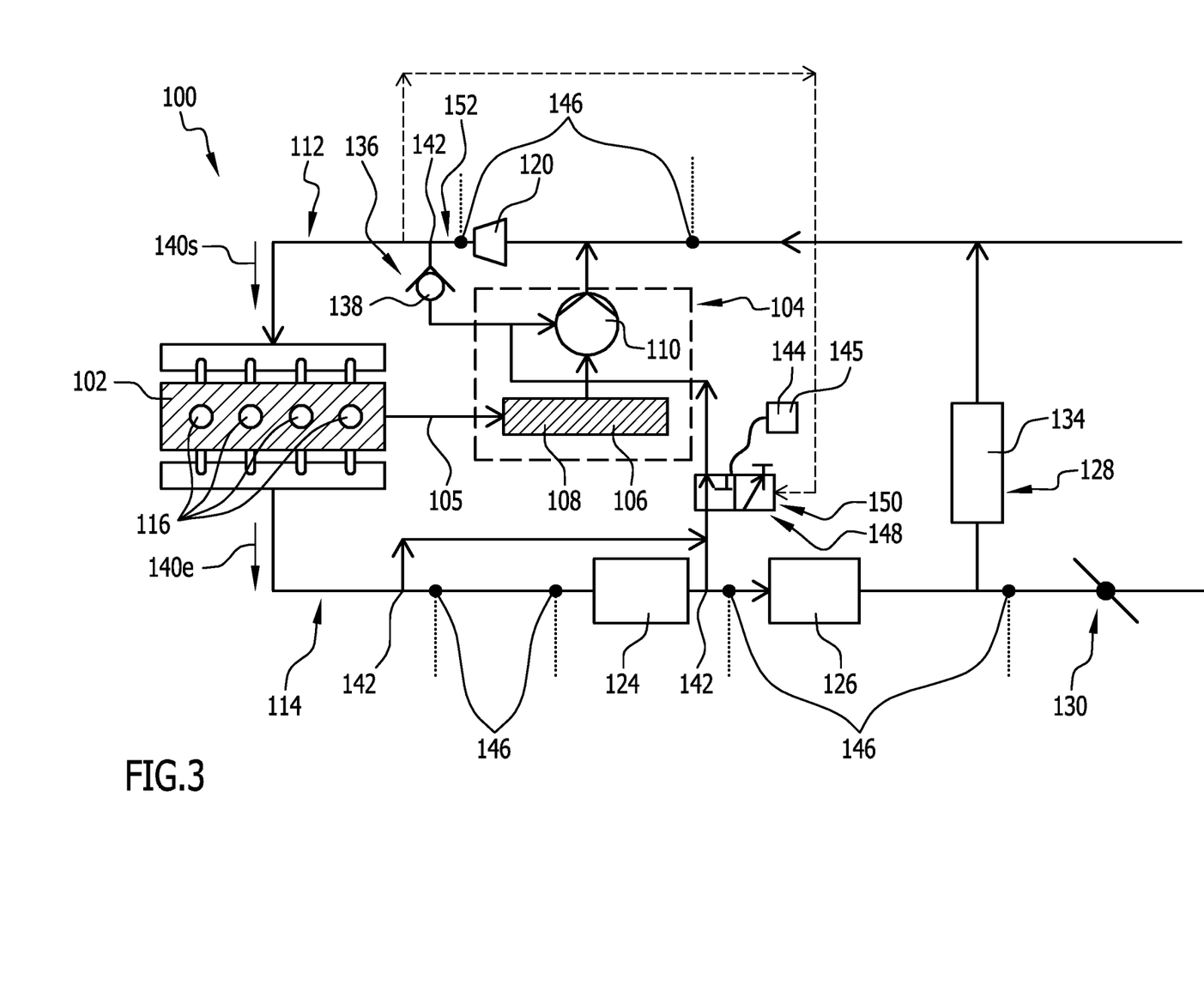
FIG. 3 shows a schematic illustration of a third embodiment of an engine device with a third embodiment of a separating device.

A third embodiment of an engine device 100 shown in FIG. 1 differs from the embodiment shown in FIG. 1 basically merely in that a compressor device 152 is provided in alternative to a turbocharger device 118. In this case, the engine device 100 then merely comprises a compression device 120, which is part of the supply air tract 112. A turbine device 122 is not provided in a compressor device of this kind.

For the rest, the third embodiment of the engine device 100 depicted in FIG. 3 is consistent in respect of structure and function with the first embodiment depicted in FIG. 1, and therefore reference is made in that respect to the description thereof provided further above.

Figure 4:
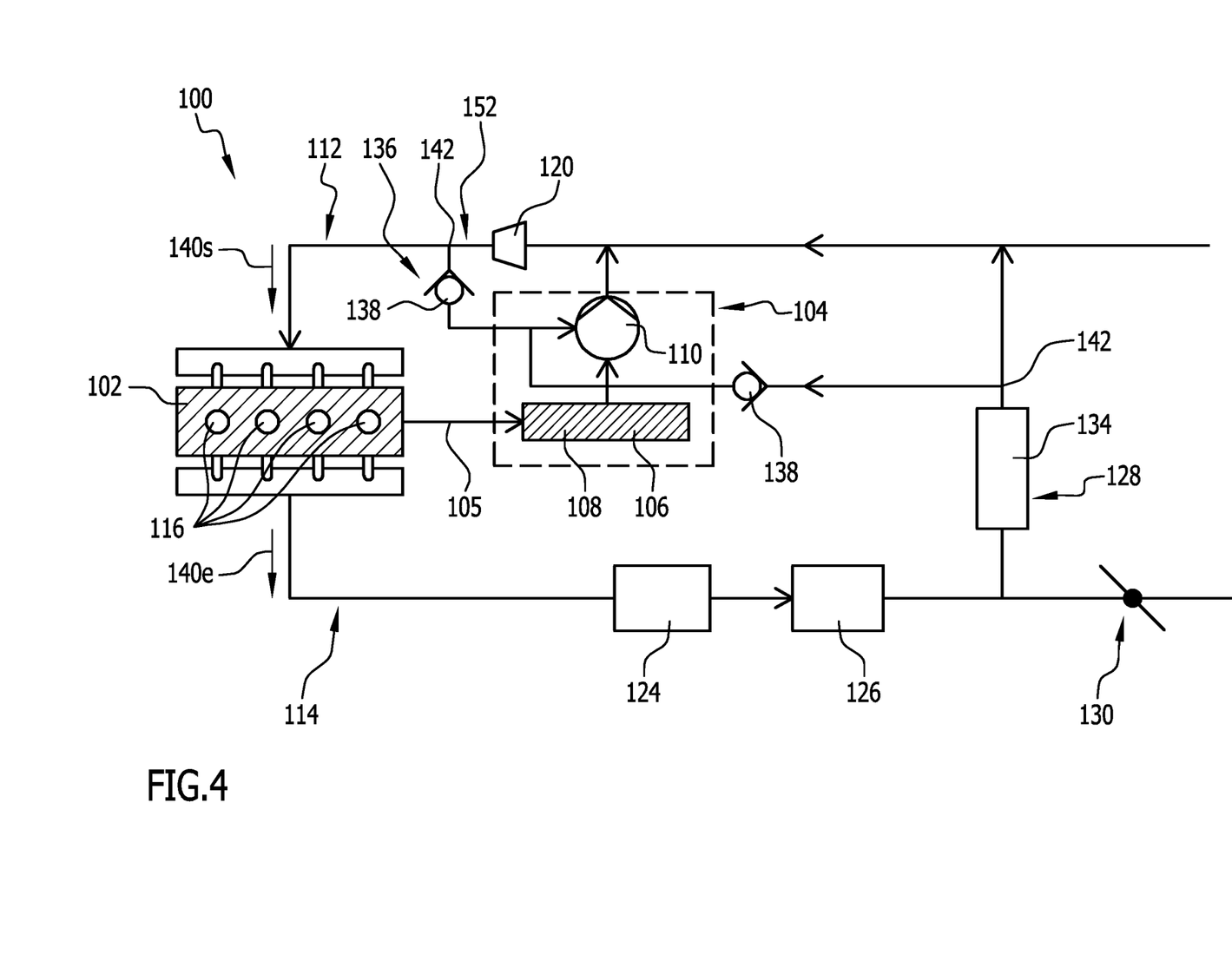
FIG. 4 shows a schematic illustration of fourth embodiment of an engine device with a fourth embodiment of a separating device.

A fourth embodiment of an engine device 100 shown in FIG. 4 differs from the third embodiment shown in FIG. 3 basically merely by the way in which the separating device 104, in particular the ejector device 110, is incorporated.

In the embodiment of the engine device 100 shown in FIG. 4, it is provided that exhaust gas used as drive medium is branched off downstream of a cooling device 134 of the exhaust gas recirculation device 128 for operation of the ejector device 110. In particular if the engine device 100 as a whole is operated with firmly closed check flap 130 and consequently high pressure in the exhaust gas recirculation device 128, the drive medium flow rate required for operation of the ejector device 110 can then be provided easily and efficiently.

For the rest, the fourth embodiment of the engine device 100 depicted in FIG. 4 is consistent in respect of structure and function with the third embodiment depicted in FIG. 3, and therefore reference is made in that respect to the description thereof provided further above.

The invention claimed is:

1. A separating device for separating impurities from a raw gas stream discharged from a combustion engine, the separating device comprising:
   at least one separating body for separating impurities of the raw gas stream;
   an ejector device for producing a suction effect on an exit side of the at least one separating body; and
   a supply device for supplying a drive medium to the ejector device,
   the drive medium being supplied by the supply device to the ejector device including at least one of:
      a) compressed supply air from a supply air tract by a compression device positioned in the supply air tract of the combustion engine;
      b) exhaust gas from an exhaust gas tract of the combustion engine; and
      c) a mixture of the compressed supply air from the supply air tract and the exhaust gas from the exhaust gas tract of the combustion engine.

2. The separating device in accordance with claim 1, further comprising a control device for controlling the drive medium being supplied to the supply device depending on at least one of operating states of the combustion engine, compositions and a volumetric flow rate of the exhaust gas.

3. The separating device in accordance with claim 2, wherein the control device is configured to control with respect to pressure differences between a pressure in the supply air tract and a pressure in the exhaust gas tract.

4. The separating device in accordance with claim 3, wherein the pressure in the supply air tract is a pressure downstream of the compression device of the supply air tract.

5. The separating device in accordance with claim 3, wherein the pressure in the exhaust gas tract is a pressure downstream of at least one of a turbine device and a catalytic device of the exhaust gas tract.

6. The separating device in accordance with claim 3, wherein the pressure in the exhaust gas tract is a pressure upstream of a turbine device of the exhaust gas tract.

7. The separating device in accordance with claim 1,
   wherein a control device is an active control device which acts actively, in at least one of an electrically sensor-controlled manner, a mechanically sensor-controlled manner and a pneumatically sensor-controlled manner on a valve device of the supply device.

8. The separating device in accordance with claim 1,
   wherein a control device is a passive control device which mechanically actuates a valve device directly due to prevailing pressure levels.

9. The separating device in accordance with claim 1,
   wherein a control device comprises at least one sensor for detecting actual pressures; and
   wherein the supply device is controlled by the control device depending on said actual pressures.

10. The separating device in accordance with claim 1, wherein the separating body is a nonwoven fabric separator.

11. The separating device in accordance with claim 1, wherein the exhaust gas serving as drive medium is branched off from the exhaust gas tract at least one of:
    a) at downstream of combustion chambers of the combustion engine;
    b) at downstream of a turbine device of the exhaust gas tract;
    c) at downstream of a catalytic device of the exhaust gas tract;
    d) at downstream of a particle filter of the exhaust gas tract; and
    e) at downstream of a cooling device of an exhaust gas recirculation device of the combustion engine.

12. The separating device in accordance with claim 1, wherein the exhaust gas serving as drive medium is branched off from the exhaust gas tract at least one of:
    a) at upstream of a turbine device of the exhaust gas tract;
    b) at upstream of a catalytic device of the exhaust gas tract;
    c) at upstream of a particle filter of the exhaust gas tract, and
    d) at upstream of a cooling device of an exhaust gas recirculation device of the combustion engine.

13. The separating device in accordance with claim 1, wherein the compressed supply air from the supply air tract and the exhaust gas from the exhaust gas tract are mixed with each other before being supplied to the ejector device.

14. An engine device comprising:
    a combustion engine; and
    a separating device separating impurities from a raw gas stream discharged from the combustion engine;
    wherein the separating device further comprising:
       at least one separating body for separating impurities of the raw gas stream;
       an ejector device for producing a suction effect on an exit side of the at least one separating body; and
       a supply device for supplying a drive medium to the ejector device,
       the drive medium being supplied by the supply device to the ejector device including at least one of:
          a) compressed supply air from a supply air tract by/via a compression device positioned in the supply air tract of the combustion engine;
          b) exhaust gas from an exhaust gas tract of the combustion engine; and c) a mixture of the compressed supply air from the supply air tract and the exhaust gas from the exhaust gas tract of the combustion engine.

15. The engine device in accordance with claim 14, wherein the engine device further comprises at least one of:
    a turbocharger device including a turbine device driving the compression device;
    a compressor device;
    a catalytic device;
    a particle filter; and
    an exhaust gas recirculation device.

16. A separation method for separating impurities from a raw gas stream discharged from a combustion engine, the separation method comprising:
    supplying a drive medium to an ejector device, wherein the drive medium includes at least one of
        a) compressed supply air from a supply air tract by a compression device positioned in the supply air tract of the combustion engine;
        b) exhaust gas from an exhaust gas tract of the combustion engine; and
        c) a mixture of the compressed supply air from the supply air tract and the exhaust gas from the exhaust gas tract of the combustion engine;
    extracting the impurities from the raw gas stream by a separating a separating device; and
    delivering a mixture of the raw gas stream having been extracted the impurities with at least one of the compressed supply air from the supply air tract, the exhaust gas from the exhaust gas tract, and the mixture of the compressed supply air from the supply air tract and the exhaust gas from the exhaust gas tract to the supply air tract via the ejector device.

17. A separation method for separating impurities from a raw gas stream, the separation method comprising:
    separating impurities via at least one separating body;
    producing a suction effect on an exit side of the at least one separating body via an ejector device;
    supplying a drive medium to the ejector device;
    selectively supplying as drive medium to the ejector device with at least one of
        a) compressed supply air from a supply air tract by a compression device positioned in the supply air tract of the combustion engine;
        b) exhaust gas from an exhaust gas tract of the combustion engine; and
        c) a mixture of the compressed supply air from the supply air tract and the exhaust gas from the exhaust gas tract of the combustion engine;
    injecting a mixture of the raw gas stream having been separated the impurities with at least one of the compressed supply air from the supply air tract, the exhaust gas from the exhaust gas tract, and the mixture of the compressed supply air from the supply air tract and the exhaust gas from the exhaust gas tract to the supply air tract via the ejector device.

* * * * *